United States Patent [19]

Pollick et al.

[11] Patent Number: 5,291,087
[45] Date of Patent: Mar. 1, 1994

[54] SEALED ELECTRIC MOTOR ASSEMBLY

[75] Inventors: Richard D. Pollick, Sarver; Dale R. Farruggia, Pitcairn, both of Pa.

[73] Assignee: Westinghouse Electric Corp., Pittsburgh, Pa.

[21] Appl. No.: 34,799

[22] Filed: Mar. 3, 1993

[51] Int. Cl.$^5$ .................................. H02K 5/10
[52] U.S. Cl. ............................ 310/86; 310/88
[58] Field of Search .............. 310/52, 54, 57, 58, 310/64, 85, 86, 88, 89, 90

[56] References Cited

U.S. PATENT DOCUMENTS

| | | | |
|---|---|---|---|
| 3,789,249 | 1/1974 | Purman | 310/54 |
| 3,873,861 | 3/1975 | Halm | 310/86 |
| 3,969,643 | 7/1976 | Sapper | 310/58 |
| 4,323,803 | 4/1982 | Danko et al. | 310/86 |
| 4,451,750 | 5/1984 | Heuer et al. | 310/88 |
| 4,549,105 | 10/1985 | Yamamoto et al. | 310/87 |
| 4,682,065 | 7/1987 | English et al. | 310/90 |
| 4,725,198 | 2/1988 | Fraser | 415/110 |
| 5,024,644 | 7/1991 | Kech | 310/254 |
| 5,097,164 | 3/1992 | Nakasugi et al. | 310/88 |
| 5,113,103 | 5/1992 | Blum et al. | 310/89 |

*Primary Examiner*—Emanuel T. Voeltz
*Assistant Examiner*—Matthew Nguyen

[57] ABSTRACT

A sealed electric motor assembly suitable for use in a hostile environment, such as high temperatures, high pressures or in atmospheres containing toxic or corrosive gases. The motor assembly is especially adapted for use with a blower assembly. The stator windings are protected from the hostile environment by hermetically sealing them between the cylindrical housing for the motor and a thin metal canister secured tightly against the inner wall of the housing. Also disclosed are arrangements for removing heat from the motor during its operation. Service life of the electric motor of this invention is greatly increased as compared to conventional motors when operated in a hostile environment.

4 Claims, 3 Drawing Sheets

SEALED ELECTRIC MOTOR ASSEMBLY

BACKGROUND OF THE INVENTION

This invention relates to electric motors and more particularly to an electric motor blower assembly used for circulating gases in a hostile environment. Conventional electric motor blower assemblies usually perform well when operated in a non-hostile environment such as blowing atmospheric air but have been found to have a short performance life if used in many hostile environments, such as the blowing or movement of gases at high temperatures or high pressures or gases containing considerable water vapor or gases that are in themselves toxic or corrosive. It has been discovered that such hostile environments usually attack the stator windings of the electric motor used in the blower assembly and cause a premature failure of the motor.

SUMMARY OF THE INVENTION

It is therefore an object of this invention to provide a new design for an electric motor assembly that will provide for a long service life in a hostile environment and atmosphere.

It is further object of this invention to provide a new design for an electric motor assembly that can be easily manufactured, installed, maintained and is easily adapted to a number of prime mover applications, such as driving a centrifugal blower.

Other and further objects of this invention will become apparent from the following description and the accompanying drawings and claims.

It has been discovered that the foregoing objects can be attained by a an electric motor assembly comprising a cylindrical metal housing for the stator windings of the motor, top and bottom closure members secured to each end of the cylindrical metal housing and which hold top and bottom bearing retainers and bearings to support the rotor shaft of the motor. A thin metal canister with back-up support rings is positioned against the inner wall of the cylindrical metal housing and welded to the top and bottom closure members to hermetically seal the stator windings between the metal canister and the cylindrical metal housing. The assembly is preferably also provided with a plurality of open ports in the bottom and top bearing retainers to allow gas to be drawn into the interior of the cylindrical metal housing around the rotor shaft for cooling the stator windings and into a blower assembly secured to one end of the rotor shaft and to the top closure member.

DESCRIPTION OF PREFERRED EMBODIMENTS

Figure 1:
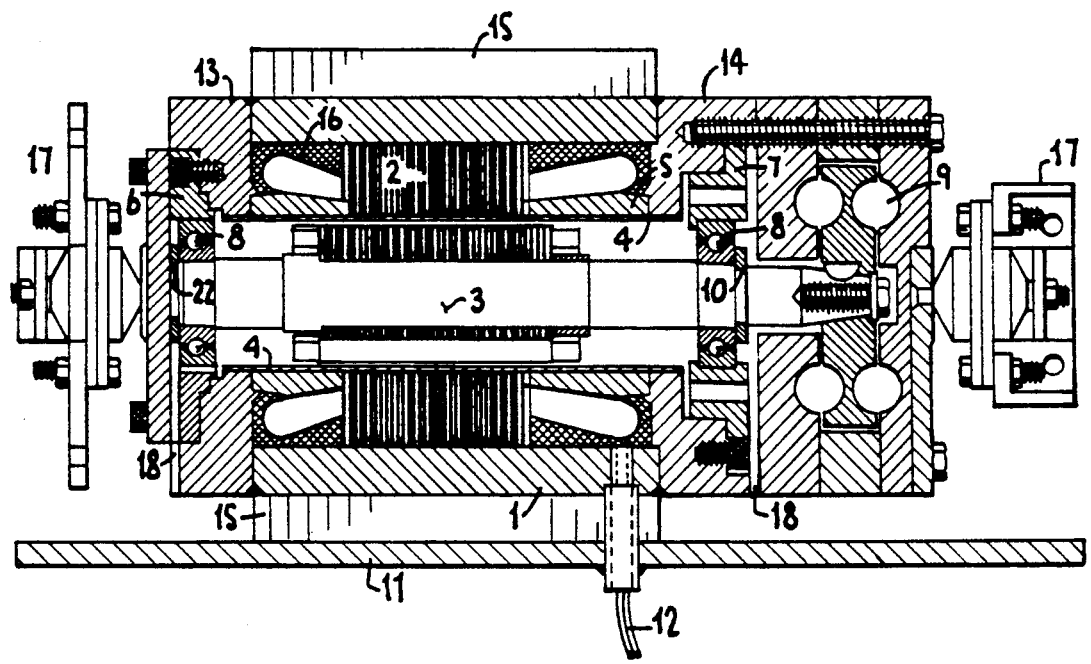
FIG. 1 is a cross sectional view of a preferred embodiment of the sealed electric motor and blower assembly of this invention.
Figure 2:
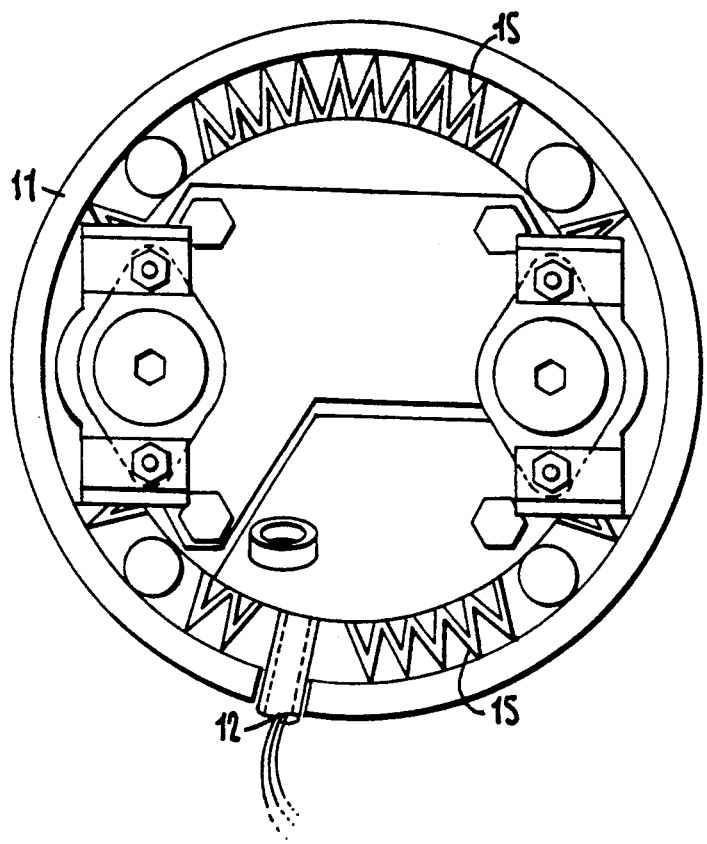
FIG. 2 is an end view of a preferred embodiment of the sealed electric motor and blower assembly of this invention.

FIGS. 1 and 2 illustrates a preferred embodiment of the sealed electric motor and blower assembly of this invention. In this embodiment the electric motor assembly is comprised of a heavy metal cylindrical housing 1 adapted to receive and hold the stator windings 2 and having a bottom closure member 13 welded or otherwise secured to one end of the housing 1 and a top closure member 14 welded to the other end of the housing 1. A bottom bearing retainer 6 is bolted or otherwise secured to the bottom closure member 13 and retains a bottom anti-friction bearing 8. A top bearing retainer 7 is also bolted or otherwise secured to the top closure member 14 and retains a top anti-friction bearing 8. A steel rotor shaft 3 is supported within the bottom bearing 8 and the top bearing 8 and secured with a clamp ring 10 and a self locking nut 22. The bearings 8 are lubricated with a high temperature resistant grease able to withstand hostile environments. The steel rotor shaft 3 is spaced from and free to rotate within the cylindrical housing 1. A blower assembly 9 is preferably attached to the top end of the rotor shaft 3 and secured to the top closure member 14 with bolts.

As shown in FIG. 1, a thin metal canister 4 is positioned against the inside wall of the cylindrical housing 1. This canister 4 is supported by a pair of metal back-up rings 5 placed over the stator windings 2 which have been potted in a protective plastic potting material 16. The ends of the metal canister 4 are welded or brazed to the inside wall surfaces of the bottom closure member 13 and the top closure member 14 or the housing 1 itself after the potted stator windings 10 have been put into position, thereby hermetically sealing the stator windings 2 between the cylindrical housing 1 and the thin metal canister 4. For this embodiment, we preferred to fabricate the metal canister 4 from 0.018 inch thick Hastalloy N and the cylindrical housing 1, the bottom closure member 13 and top closure member 14 from 304 stainless steel and weld the canister 4 to the top and bottom closure members 14 and 13 using an inconel weld material.

In FIG. 1, I have illustrated the sealed electric motor and blower assembly of this invention installed in an enclosure 11 and held in place at the top and bottom by vibration isolation mounts 17 and 17'. An electrical conductor conduit 12 is shown passing through the wall 11 of the enclosure and the wall of the cylindrical housing 1. If desired, the outside wall of the cylindrical housing 1 may be fitted with fins 15 to help dissipate the heat generated by the motor.

Figure 3:
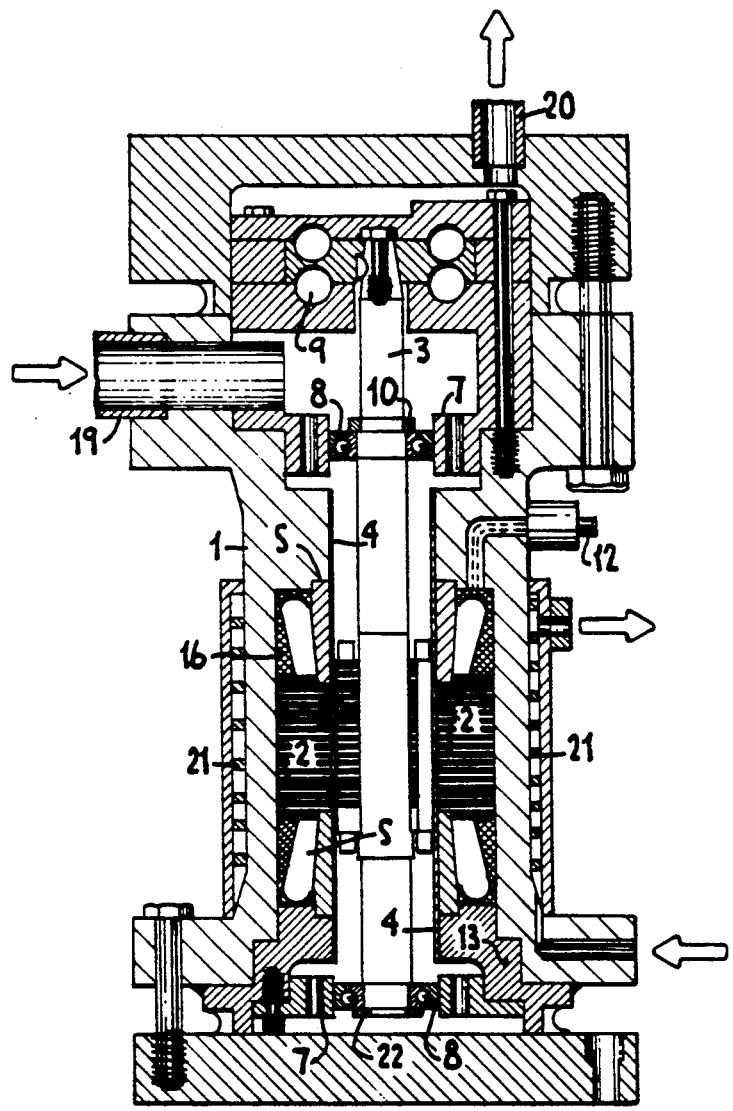
FIG. 3 is a cross sectional view of another embodiment of the sealed electric motor and blower assembly of this invention.

In FIG. 3, I have illustrated another embodiment of the sealed electric motor blower assembly of this invention. In this embodiment the top closure member 13 is formed as an integral part of the cylindrical housing 1. In this embodiment, all the gas to be blown is introduced into the centrifugal blower assembly 9 through an inlet orifice 19 and discharged through an outlet orifice 20. This embodiment cools the sealed motor assembly of this invention by a liquid cooled outer jacket 21 placed around the outside of the housing 1 instead of using an internal circulation of a portion gas around rotor shaft 3 and the external cooling fins 15 as described for the previous embodiment of this invention.

The sealed electric motor assemblies of these two embodiments were designed for military as well as civilian applications where the motor must withstand a hostile environment such as gases at high temperatures or pressures or gases containing considerable water vapor or gases that are in themselves toxic or corrosive. A typical example of a motor design using this invention would be a three horsepower, 3600 rpm synchronous speed induction motor capable of withstanding 160 degrees Fahrenheit temperatures and pressures of up to 4500 psia. Such a motor is expected to provide more than 20,000 hours of effective service life in a harsh, hostile environment.

As shown in FIGS. 1 and 3, the sealed electric motor blower assembly of this invention is preferably provided with a plurality of slots or ports 18 in the bottom bearing retainer 6 and the top bearing retainer 7 to allow some of the gas to drawn into the interior cavity of the cylindrical housing 1 and around the rotor shaft 3 and then into the centrifugal blower assembly 9. This allows heat from the motor to be drawn out of the motor by operation of the centrifugal blower assembly 9 and helps to prolong the service life of the motor. The metal canister 4 prevents these cooling gases from attacking the stator windings 2 while the gases cool the motor cavity. The potting of the stator windings 2 and the fins 15 on the exterior of the housing 1 also aid in the cooling of the motor and its components.

While what has been described are the preferred embodiments of the sealed electric motor and blower assembly of this invention, it is to be understood that variations of this system may be made are within the contemplated scope of this invention. For example, while the motor of this invention has been described in connection with driving a centrifugal blower assembly, it could be used also for other prime mover applications in a harsh, hostile environment.

We claim:

1. An electric motor assembly comprising:
   (A) a cylindrical metal housing adapted to receive and hold stator windings,
   (B) a bottom closure member at one end of said housing,
   (C) a top closure member at the other end of said housing,
   (D) a bottom bearing retainer secured to said bottom closure member,
   (E) a top bearing retainer secured to said top closure member,
   (F) a bottom bearing mounted in said bottom bearing retainer,
   (G) a top bearing mounted in said top bearing retainer,
   (H) a rotor shaft extending within said housing and supported within said bottom bearing and said top bearing,
   (I) a cylindrical metal canister concentric within said housing positioned between said stator windings and said rotor shaft and welded to said bottom closure member and said top closure member thereby hermetically sealing the stator windings between said metal canister and said metal housing,
   (J) a plurality of open ports in said bottom bearing retainer and said top bearing retainer adapted to allow gas to be drawn into the interior of said motor assembly around said rotor shaft and within said cylindrical metal canister and discharged therefrom.

2. The electric motor assembly of claim 1 in which the exterior of said cylindrical metal housing is provided with cooling fins.

3. The electric motor assembly of claim 1 in which the exterior of said cylindrical metal housing is liquid cooled.

4. The electric motor assembly of claim 1 in which the bottom closure member and the top closure member are welded to the cylindrical metal housing and to said metal canister.

* * * * *